Patented Apr. 28, 1936

2,038,633

UNITED STATES PATENT OFFICE 2,038,633

MANUFACTURE OF A GLUTEN-LIKE PRODUCT

Moritz Bienenstock and Ladislaus Csáki, Budapest, Hungary, Julius Pless, Bratislava, Czechoslovakia, and Adalbert Sági and Eugen Sági, Budapest, Hungary No Drawing. Application August 15, 1932, Serial No. 628,957. In Hungary August 31, 1931

14 Claims. (Cl. 99—17)

The present invention relates to the manufacture of a gluten-like product which possesses the same properties as wheat gluten and is adapted to be worked up in the same way and to be used for all purposes for which wheat gluten has been used heretofore. Wheat flour differs from the flour of all other cereals and other grains in the property of leaving behind, on continued kneading of the dough under water, its protein compounds in the form of a resilient coherent body which alone is correctly designated as "gluten".

The process according to the invention consists substantially in the fact that the seed kernels of the carob tree (Ceratonia siliqua) or related plants of the family of the Caesalpiniaceæ and Mimosaceæ, for example, the Cercis specis (Cercis siliquastrum, Cercis canadensis, Cercis chinensis), or the separated germinal substance of such seed kernels are manufactured into gluten similar to wheat gluten by the methods suitable for the production of wheat gluten.

In working up the seed kernels, the latter are preferably husked and comminuted and extracted with warm water in order to recover the soluble substances in as concentrated a form as possible. The gluten is then washed out of the residue. It is, however, preferable to start with the separated germinal substance since this can readily be separated from the other organs by mechanical methods. It is merely necessary to take care that the physico-chemical properties of the proteins are not injured either by chemical or thermal influences. In carrying out the separation by the wet method, the germinal substance is afterwards dried at so low a temperature (preferably not above 40–50° C.) that such injury is likewise avoided. It is advisable to promote drying by means of a vacuum or a heated current of air. The germinal substance is preferably ground to a fine flour which is made into a paste or dough with one to three times the quantity of water. By continued kneading of the dough under water, the gluten is separated from the accompanying cellulosic substances and at the same time it is freed from the main quantity of a green colouring matter. The pure gluten is obtained by repeatedly changing the water with continued kneading or, as is usual for the recovery of wheat gluten, by washing over a fine sieve by means of a jet of water. Instead of making a flour of the germinal substance to serve as starting product for the production of gluten, the germinal substance may be prepared for the production of gluten, preferably without previous drying, by crushing trituration or such other methods as are also suitable for disintegrating wet material.

The gluten remains as a resilient and extensible mass with a lustre like mother of pearl. The mass is practically insoluble in water and after a time becomes glutinous. This mass contains approximately 60% by weight of water, and may be dried in a thin layer and triturated to a flour. In investigating this gluten it has not yet been possible to find any substantial differences in comparison with wheat gluten. More particularly, the physico-chemical properties of the two kinds of gluten are perfectly identical. Since plant species other than wheat from which gluten could be washed out as a resilient coherent body were heretofore unknown, and since the raw material employed according to the invention for the production of gluten is available in large quantities and comparatively cheaply, this new method of manufacturing gluten is of considerable importance. Husked and degerminated carob bean kernels are already brought on the market in the form of flour which is used for the manufacture of adhesives, sizes and finishers, and binding agents. Heretofore, it was not recognized that the waste germinal substances contained valuable proteins which are practically fully equivalent to the gluten proteins of wheat (which proteins, however, do not occur there in the embryo).

Externally, the gluten obtained from the germinal substance of the plant genera specified differs from wheat gluten in its darker colour. If desired, however, the gluten may be decolourized in a simple manner by the action of dilute acids on the germinal substance (before or during its manufacture into gluten) or by the subsequent treatment of the gluten with acids or by a bleaching of the usual type, more particularly by means of oxidizing bleaching agents (such as hypochlorites, for example sodium-p-toluene-sulphochloramide, peroxides, per-salts or the like).

The gluten so obtained may inter alia be used for alimentary purposes, for instance for the manufacture of articles in paste form or of baked products rich in proteins. For this purpose the gluten may preferably be mixed with food flours or with other diluting materials such as albuminous food of animal or vegetable origin, cellulose, starch or the like. The same object may be attained by denaturing a portion of the gluten by heating, and employing the gluten in this condition for diluting unaltered gluten therewith.

For the purpose of preparing diabetic foods, the addition of carbohydrates has, as usual, to be avoided entirely or restricted to a small amount.

*Examples*

1. The seed kernels of *Ceratonia siliqua* are husked either in the dry or soaked condition. The separation of the germinal substance is most simply effected by splitting the husked seeds and sieving out the crumbly embryo parts. 100 kilograms of a flour obtained by milling this germinal substance are made into a paste with 100 litres of water. The paste or dough is treated in a kneading machine, with the addition of further quantities of washing water. The yellowish green washing water together with the cellulose washed out is removed, fresh water is added and kneading is repeated. This process is continued until no grains or only a few grains are to be found in a thin layer of the residual mass.

2. 100 kilograms of germinal substance flour from *Ceratonia siliqua* are suspended in 1000 litres of water, whereupon the suspension is either allowed to settle or is centrifuged. The lower layer contains the gluten and the upper layer the cellulose. The gluten layer is repeatedly treated with water.

The wet gluten obtained according to Examples 1 and 2 is cut into cakes and is subjected to an intermittent (fractional) sterilization. In this condition the gluten is stable for a considerable time; it does not undergo any change in its physical and chemical properties. The wet gluten, however, may also be dried in a thin layer at room temperature or it may be left to dry completely in a vacuum at 40–50° C. The gluten dried by the one or the other method may be made into grits or flour in suitable comminuting apparatus so as to obtain in this way a dried product which can be used directly.

3. A hundred kilograms of germinal substance flour from *Ceratonia siliqua* is made into a paste with 100 litres of water containing 500–1000 grams of citric acid, tartaric acid or other acids in equivalent quantities, and is then treated as in Example 1. On repeating the kneading, it is preferable to add a further 200–300 grams of citric acid to each 100-litre lot of water. The gluten thus obtained is not greenish after drying but exhibits a brownish yellow colour.

4. The wet gluten obtained according to Examples 1 or 2 is kneaded with acid solutions or with solid acids; the quantity of acid employed should not exceed 1% calculated as citric acid. The gluten thus obtained also does not exhibit any greenish colour.

5. Sixty kilograms of wheat flour from which 8 per cent, by weight of a low-grade gluten can be obtained by washing is mixed with 40 grams of germinal substance flour from *Ceratonia siliqua*, whereupon this mixture is made into a paste with 70–75 litres of water. The paste or dough is now treated in a kneading machine with the addition of further quantities of water, the yellowish green wash water which contains starch grains and cellulose grains being collected for the recovery of the starch. After repeated washing about 21 per cent. by weight of gluten is obtained from the mixed flour, which corresponds to the sum of the partial quantities which can be obtained from the two kinds of flour separately.

6. The separated, ground or unground germinal substance of *Ceratonia siliqua* or the gluten obtained according to Examples 1 or 2 is left at room temperature until active putrefaction has set in. The product is then dried in vacuum. The gluten adhesive so obtained possesses a high adhesive power.

As is usual in the case of wheat gluten, the adhesive power of the gluten may also be increased by treatment with dilute acids or alkalies, so much acid or alkali being added as to produce a glutinous mass.

Mixtures of the ground or unground germinal substance with wheat grain or wheat flour may be converted into a gluten adhesive by the same methods, without the preliminary removal of the cellulose, the cellulose being decomposed, if desired, by the co-operation of cellulose-dissolving bacteria.

We claim:—

1. A process which comprises separating the germinal substance of seed kernels of the families of Caesalpiniaceæ and Mimosaceæ from the endosperm matter and treating said germinal substance with water to that point at which a gluten-like coherent mass is developed which is left, while the cellulosic constituents are washed away.

2. A process which comprises separating the germinal substance of seed kernels of *Ceratonia siliqua* from the endosperm and treating the said germinal substance with water to that point at which a gluten-like coherent mass is developed which is left, while the cellulosic constituents are washed away.

3. A process which comprises detaching the germinal substance of seed kernels of representatives of the class consisting of the families of Caesalpiniaceæ and Mimosaceæ from the endosperm, grinding the said substance to meal, impasting the meal and kneading the dough with water to that point at which a gluten-like coherent mass is developed which is left, while the cellulosic constituents are washed away.

4. A process which comprises separating the germinal matter of *Ceratonia siliqua* from the endosperm, grinding the said matter to meal, impasting the meal, kneading the dough under water until a gluten-like coherent mass is left, and repeatedly washing the said mass to obtain pure gluten.

5. A process of recovering a gluten-like product other than wheat gluten which comprises separating the germinal matter of *Ceratonia siliqua* from the endosperm, grinding the said matter to meal, suspending the meal in a large amount of water causing the suspension to separate into two layers, doing away with the upper layer, treating the lower layer, containing the gluten, repeatedly with water, and recovering the gluten therefrom.

6. A process which comprises separating the germinal matter of *Ceratonia siliqua* from the endosperm by way of wet process, drying the said germinal matter at a temperature below 50° C. and grinding it to meal, impasting the meal, and then kneading the dough under water until a gluten-like coherent mass is left.

7. A process which comprises mixing wheat flour and meal of the germinal substance from *Ceratonia siliqua*, impasting the mixture, working the dough up, by means of water, into a gluten-like coherent mass, separating the starch, and recovering the gluten.

8. A process which consists in separating, by the action of water, a gluten-like product from seed kernels of representatives of the class consisting of the families of Caesalpiniaceæ and Mimosaceæ, and acting upon the product thus obtained with agents having the capacity of increasing the adhesive power, to produce a glutinous mass therefrom.

9. A process which comprises recovering from seed kernels of *Ceratonia siliqua* by a treatment with water and insoluble gluten-like product other than wheat gluten, and decolorizing the said product by the action of dilute acids.

10. A process which comprises recovering from seed kernels of *Ceratonia siliqua* by a treatment with water an insoluble gluten-like product other than wheat gluten, and decolorizing the said product by subsequent treatment with a bleaching agent.

11. A process which comprises separating the germinal substance of seed kernels of *Ceratonia siliqua* from the endosperm matter, treating said germinal substance with water to that point at which a gluten-like coherent mass is developed which is left, while the cellulosic constituents are washed away, and making the gluten-like mass stable by a drying process.

12. A gluten-like resilient mass derived from from the proteins contained in the germinal substance of the seed kernels of representatives of the class consisting of the families of Caesalpiniaceæ and Mimosaceæ, and substantially free from water-soluble matter and celluloses.

13. A gluten-like resilient mass derived from the proteins contained in the germinal substance of the seed kernels of representatives of the Cercis species, and substantially free from water-soluble matter and celluloses.

14. A gluten-like resilient mass derived from the proteins contained in the germinal substance of the seed kernels of *Ceratonia siliqua*, and substantially free from water-soluble matter and celluloses.

JULIUS PLESS.
MORITZ BIENENSTOCK.
LADISLAUS CSÁKI.
EUGEN SÁGI.
ADALBERT SÁGI.